United States Patent
Xu et al.

(10) Patent No.: US 7,576,508 B2
(45) Date of Patent: *Aug. 18, 2009

(54) GAS TURBINE ENGINE STARTER GENERATOR WITH AC GENERATOR AND DC MOTOR MODES

(75) Inventors: Mingzhou Xu, Tucson, AZ (US); Wei Chen, Tucson, AZ (US); Wayne T. Pearson, Tucson, AZ (US); William M. Scherzinger, Tucson, AZ (US); Michael W. Duddek, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1296 days.

This patent is subject to a terminal disclaimer.

(21) Appl. No.: 10/354,782

(22) Filed: Jan. 30, 2003

(65) Prior Publication Data

US 2004/0150232 A1   Aug. 5, 2004

(51) Int. Cl.
| | |
|---|---|
| H01R 39/42 | (2006.01) |
| H01R 39/44 | (2006.01) |
| H02K 13/00 | (2006.01) |
| H02P 1/16 | (2006.01) |
| H02P 3/00 | (2006.01) |
| H02P 5/00 | (2006.01) |
| H02P 7/00 | (2006.01) |

(52) U.S. Cl. ..................................... 318/541
(58) Field of Classification Search ......... 318/537–541, 318/800, 773–777, 561–700, 140–153; 310/299; 322/54, 10–28; 290/10–52
See application file for complete search history.

(56) References Cited

U.S. PATENT DOCUMENTS

| | | | |
|---|---|---|---|
| 599,932 | A | 3/1898 | Frankenfield et al. |
| 3,378,755 | A | 4/1968 | Sawyer |
| 3,577,002 | A * | 5/1971 | Hall et al. .................. 290/46 |
| 3,619,746 | A | 11/1971 | Thornton et al. |
| 3,771,046 | A | 11/1973 | Harter |
| 4,072,880 | A | 2/1978 | Oshima et al. |
| 4,459,532 | A | 7/1984 | Schutten et al. |
| 4,547,689 | A | 10/1985 | Tsuchimoto et al. |
| 4,675,591 | A | 6/1987 | Pleiss |
| 4,704,552 | A | 11/1987 | Masterman |
| 4,743,777 | A * | 5/1988 | Shilling et al. ............... 290/46 |
| 4,786,853 | A | 11/1988 | VanMaaren |
| 4,939,441 | A | 7/1990 | Dhyanchand |
| 4,992,771 | A * | 2/1991 | Caporali et al. .......... 338/22 R |

(Continued)

FOREIGN PATENT DOCUMENTS

GB            826309        12/1959
WO  PCT/US2004/002298     9/2004

*Primary Examiner*—Walter Benson
*Assistant Examiner*—Erick Glass
(74) *Attorney, Agent, or Firm*—Oral Caglar, Esq.

(57) ABSTRACT

A rotating electrical machine, such as an aircraft starter-generator, that may be operated in either a DC motor mode or an AC generator mode. The machine includes a main stator that is selectively configurable as a multi-pole AC stator and a multi-pole DC stator. The machine also includes DC brushes that are selectively moveable into, and out of, electrical contact the main rotor, to thereby electrically couple and decouple a DC power source to and from, respectively, the rotor windings.

31 Claims, 6 Drawing Sheets

U.S. PATENT DOCUMENTS

| | | |
|---|---|---|
| 5,068,590 A | 11/1991 | Glennon et al. |
| 5,103,153 A | 4/1992 | Droho |
| 5,418,436 A | 5/1995 | Apuzzo |
| 5,418,446 A * | 5/1995 | Hallidy .................... 322/28 |
| 5,428,275 A | 6/1995 | Carr et al. |
| 5,455,885 A | 10/1995 | Cameron |
| 5,537,020 A | 7/1996 | Couture et al. |
| 5,546,742 A | 8/1996 | Shekhawat et al. |
| 5,594,322 A | 1/1997 | Rozman et al. |
| 5,650,707 A | 7/1997 | Lipo et al. |
| 5,838,085 A | 11/1998 | Roesel, Jr. et al. |
| 5,850,138 A * | 12/1998 | Adams et al. ............ 322/68 |
| 5,929,611 A | 7/1999 | Scott et al. |
| 6,025,693 A | 2/2000 | Smith |
| 6,034,511 A | 3/2000 | Scott et al. |
| 6,323,625 B1 * | 11/2001 | Bhargava .................. 322/32 |
| 6,489,692 B1 * | 12/2002 | Gilbreth et al. ............ 290/52 |
| 6,628,005 B2 * | 9/2003 | Nelson et al. ............ 290/40 C |
| 6,664,653 B1 * | 12/2003 | Edelman .................. 290/52 |
| 6,737,836 B2 | 5/2004 | Namai |
| 6,768,278 B2 * | 7/2004 | Xu et al. .................. 318/140 |
| 6,906,479 B2 * | 6/2005 | Xu et al. .................. 318/140 |
| 6,909,263 B2 * | 6/2005 | Xu et al. .................. 322/29 |
| 6,979,979 B2 * | 12/2005 | Xu et al. .................. 322/59 |
| 6,995,478 B2 * | 2/2006 | Xu et al. .................. 290/52 |
| 7,078,826 B2 * | 7/2006 | Xu et al. .................. 290/52 |
| 7,327,048 B2 * | 2/2008 | Xu et al. .................. 290/52 |
| 2001/0033116 A1 | 10/2001 | Rose, Sr. |

* cited by examiner

GAS TURBINE ENGINE STARTER GENERATOR WITH AC GENERATOR AND DC MOTOR MODES

FIELD OF THE INVENTION

The present invention relates to rotating electrical machines such as starter generators for gas turbine engines and, more particularly, to starter-generator is selectively convertible between operation as an AC generator and a DC motor.

BACKGROUND OF THE INVENTION

An aircraft may include various types of rotating electrical machines such as, for example, generators, motors, and motor/generators. Motor/generators are used as starter-generators in some aircraft, since this type of rotating electrical machine may be operated in both a motor mod and a generator mode. A starter-generator may be used to start the engines or auxiliary power unit (APU) of an aircraft when operating as a motor, and to supply electrical power to the aircraft power distribution system when operating as a generator. Thus, when operating as a motor, a starter-generator may be designed to supply mechanical output torque sufficient to start the engines.

One particular type of aircraft starter-generator includes three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating as a generator. Conversely, if the starter-generator is operating as a motor, the control device supplies AC power.

If the starter-generator is operating in generator mode, DC current from the regulator or control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating motor mode, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

The above-described starter-generator may include relatively complex and heavy power electronics circuits in the control device. For example, some control devices may include inverters, for converting DC to AC power, rectifiers, for converting AC power to DC power, and potentially complex voltage and frequency control circuits. Although brush-type DC machines may alleviate the need for some of these complex and heavy electronic circuits, these also suffer certain drawbacks. For example, the brushes tend to wear fairly quickly, reducing machine reliability, and increasing the need for periodic maintenance and cleaning.

Hence, there is a need for a starter-generator that does not rely on relatively complex and heavy inverters and frequency control circuits for proper operation, and/or does not suffer reduced reliability from brush wear, and/or the need for potentially frequent maintenance and cleaning. The present invention addresses one or more of these needs.

SUMMARY OF THE INVENTION

The present invention provides a starter-generator that does not incorporate relatively complex power conversion and frequency control circuits, which reduces the weight and cost as compared to some current starter-generators, and that may increase the wear life of the DC brushes, which reduces the need for cleaning and maintenance.

In one embodiment, and by way of example only, a gas turbine engine starter-generator includes a housing, a main rotor, and a main stator. The main rotor is rotationally mounted within the housing. The main stator is mounted within the housing and is located at least partially around at least a portion of the main rotor. The main stator is selectively configurable as either an M-pole AC stator or an N-pole DC stator.

In a further exemplary embodiment, a gas turbine engine starter-generator includes a housing, a rotor, a stator, a plurality of rotor windings, and at least two brushes. The rotor is rotationally mounted within the housing. The stator is mounted within the housing and is located at least partially around at least a portion of the rotor. The plurality of rotor windings is wound on at least a portion of the main rotor. The brushes are adapted to electrically couple to a DC power source and are selectively moveable into, and out of, electrical contact with at least a portion of the rotor, whereby the brushes are electrically coupled to, and decoupled from, respectively, the rotor windings.

In another exemplary embodiment, a gas turbine starter-generator includes a housing, a main rotor, a main stator, a plurality of main stator windings, and a plurality of first switches. The main rotor is rotationally mounted within the housing. The main stator is mounted within the housing and is located at least partially around at least a portion of the main rotor, and the plurality of main stator windings are wound around at least a portion of the main stator. The plurality of first switches are electrically coupled between selected ones of the main stator windings, and each has at least a first position and a second position. In the first position, the first switches electrically couple the main stator windings such that the main stator is configured as an M-pole AC stator. In the second position, the first switches electrically couple the main stator windings such that the main stator is configured as an N-pole DC stator.

In still another exemplary embodiment, a stator includes a main stator body, and a plurality of stator coils wound around at least a portion of the main body. The stator coils are wound in a configuration that allows the stator to be selectively configured as one of an M-pole AC stator and an N-pole DC stator.

In yet still another exemplary embodiment, a motor/generator with a stator having a plurality of stator windings wound around at least a portion thereof is operated by a method that includes electrically coupling at least a portion of the stator windings together such that the main stator is configured as an N-pole DC stator. DC power is supplied to the electrically coupled stator windings, to thereby operate the motor/generator as a DC motor. At least a portion of the stator windings are electrically coupled together such that the main stator is configured as an M-pole AC stator, and the DC power is no longer supplied to the electrically coupled stator coils, to thereby operate the motor/generator as an AC generator.

Other independent features and advantages of the preferred starter-generator will become apparent from the following detailed description, taken in conjunction with the accompanying drawings which illustrate, by way of example, the principles of the invention.

DETAILED DESCRIPTION OF A PREFERRED EMBODIMENT

Figure 1:
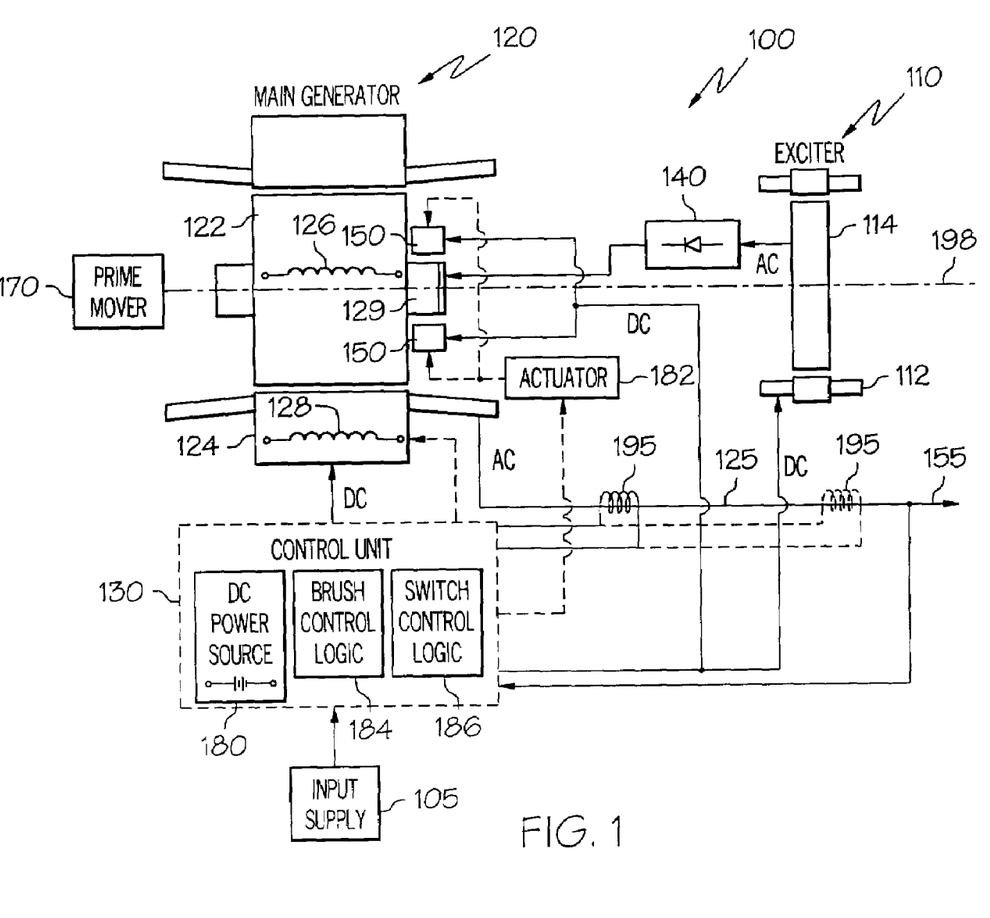
FIG. 1 is a simplified schematic block diagram of an exemplary high speed starter-generator system according to an embodiment of the invention.

A functional schematic block diagram of one embodiment of a high speed motor/generator system 100 is shown in FIG. 1. This exemplary motor/generator system 100 includes an exciter 110, a main motor/generator 120, a motor/generator control unit 130, one or more rectifier assemblies 140, and one or more pairs of brushes 150. It is noted that the motor/generator system 100 may be used as a starter-generator, operable at various speeds, for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating in a generator mode, a stator 124 of the main motor/generator 120, as will be described more fully below, is configured as a multi-pole AC stator, and the brushes 150 are preferably moved out of physical contact with a main motor/generator rotor 122. The motor/generator control unit 130, which is coupled to receive power from an input supply source 105, supplies controllable DC power to a stator 112 of the exciter 110, but is configured so that DC power is not supplied to the main stator 124. A prime mover 170 such as, for example, a gas turbine engine, rotates both a rotor 114 of the exciter 110 and the main motor/generator rotor 122. As the exciter rotor 114 rotates, it generates and supplies AC power to the rectifier assemblies 140. The output from the rectifier assemblies 140 is DC power and is supplied to rotor windings 126 wound on the main motor/generator rotor 122. As a result, AC power is output from stator windings 128 wound on the main motor/generator stator 124. It will be appreciated that DC power can be obtained from the AC power output from the motor/generator system 100, if so desired, by including one or more rectifiers.

During its operation in a generator mode, the motor/generator system 100 is capable of supplying output power at a variety of frequencies. Alternatively, a gearing system may be used to operate the motor/generator at a constant speed and, thus, supply a constant frequency. The output power from the main motor/generator stator 124 is typically three-phase AC power. One or more stator output leads 125 supplies the generated AC power to external systems and equipment via one or more terminal assemblies 155. The motor/generator control unit 130 can regulate the power output based upon monitoring signals provided to it from monitoring devices 195. In the depicted embodiment, the exciter 110 and the main motor/generator 120 both rotate along a single axis 198 at the same rotational speed. It will be appreciated, however, that in other embodiments the exciter 110 may rotate along a different axis. Moreover, the relative positioning of the exciter 110 and the main motor/generator 120 can be modified in different embodiments such that the exciter 110 is physically located on the other side of the main motor/generator 120.

Figure 2:
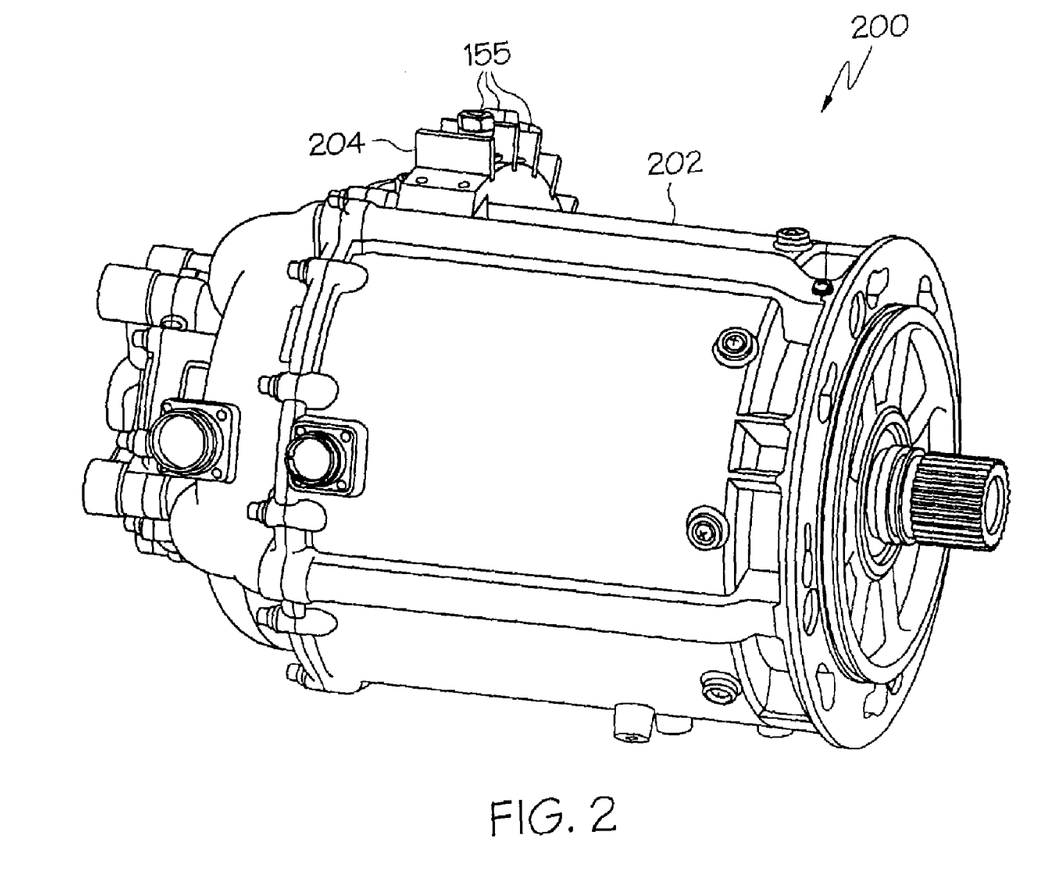
FIG. 2 is a perspective view of a physical embodiment of the starter-generator system depicted in FIG. 1.

When the motor/generator system 100 is operating in a motor mode, the main motor/generator stator 124 is configured as a multi-pole DC stator, and the brushes 150 are moved into physical contact with the main motor/generator rotor 124. A DC power source 180, which is electrically coupled to the brushes 150, supplies DC power to the main motor/generator rotor windings 126, via a commutator 129. The control unit 130 is additionally configured to supply DC power to the main motor/generator stator windings 128, and no longer supply the controllable DC power to the exciter stator 112. It should be appreciated that the DC power that is supplied to the main motor/generator stator windings 128 may be come from the same, or a separate, DC power source that supplies the brushes 150. In any case, as a result of this configuration, the main motor/generator rotor 124 is rotated, supplying rotational power to, for example, the gas turbine engine 170. In the depicted embodiment, the brushes 150 are moved in to, and out of, contact with the main motor/generator rotor 122 using an actuator 182, which is controlled using, for example, brush control logic 184. In the depicted embodiment, the brush control logic 184 is located in the control unit 130, though it will be appreciated that it could be located elsewhere. A perspective view of an exemplary physical embodiment of at least those portions of the motor/generator system 100 that are mounted within a housing 200 is illustrated in FIG. 2.

Figure 3:
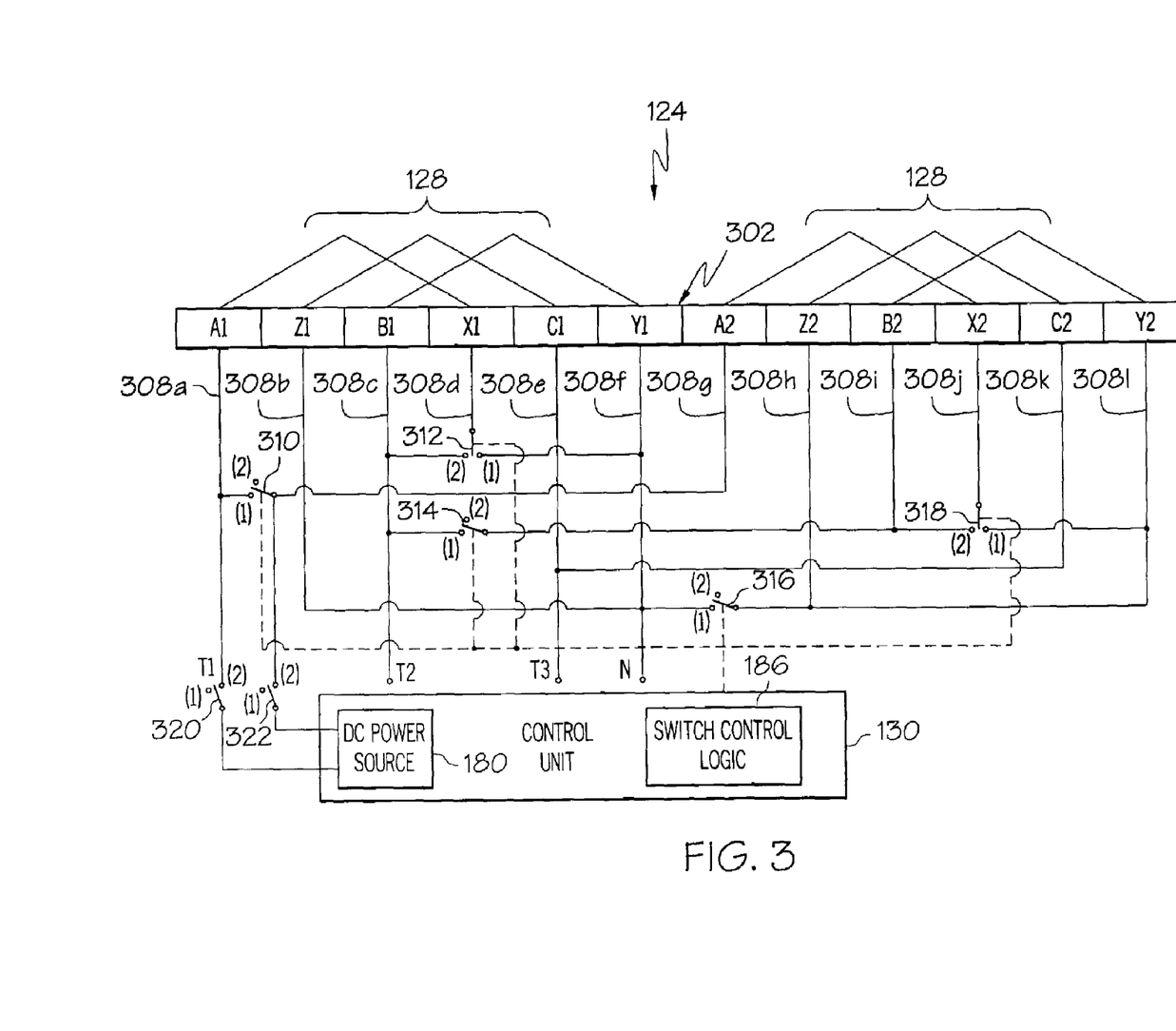
FIG. 3 is simplified representation of main stator windings that may be used in the starter-generator of FIGS. 1 and 2, which schematically depicts various switched interconnections between stator winding segments according to an exemplary embodiment of the present invention.

Turning now to FIG. 3, a simplified representation of an exemplary embodiment of the main motor/generator stator 124, schematically depicting various switched interconnections between stator winding segments is shown. It will be appreciated that the stator 124 is typically cylindrical in shape; however, for clarity and ease of explanation, it is shown in a flat, linear configuration. The stator 124 includes a main body (or core) 302, around which the stator windings 128 are wound. The stator core 302 is formed by a plurality of stator lamination sections A1, B1, C1, X1, Y1, Z1, A2, B2, C2, X2, Y2, Z2, each of which includes one or more slots (not illustrated). The stator windings 128 are wound around the stator core 302 by inserting a portion of each winding into, and through, the slots in two or more stator sections A1, B1, C1, X1, Y1, Z1, A2, B2, C2, X2, Y2, Z2. The stator windings 128 are then electrically coupled, as described more fully below, to generate desired magnetic field polarities when current flows through the stator windings 128. It is noted that, for clarity, only a single winding 128 is shown inserted through each stator section A1, B1, C1, X1, Y1, Z1, A2, B2, C2, X2, Y2, Z2. However, it will be appreciated that more than one stator winding 128 may be inserted through each stator section A1, B1, C1, X1, Y1, Z1, A2, B2, C2, X2, Y2, Z2 and electrically coupled together.

At least one conductor lead 308a-l extends from each of the stator sections A1, B1, C1, X1, Y1, Z1, A2, B2, C2, X2, Y2, Z2. Each lead 308a-l is electrically coupled to each of the stator windings 128 that extend through the respective stator section A1, B1, C1, X1, Y1, Z1, A2, B2, C2, X2, Y2, Z2 from which each lead 308a-l extends. Six of the leads 308a, 308b, 308c, 308e, 308f, and 308k are electrically coupled to one of four terminals T1, T2, T3, N, which are in turn electrically coupled to the above-referenced output leads 126 (not shown in FIG. 3). A plurality of controllable stator switches 310-322 are electrically coupled to selectively interconnect various ones of the leads 308a-d, 308f-j, and 308l, and to selectively couple two of the leads 308a and 308g to the DC power source 180. In the depicted embodiment, the stator switches 310-322 each have at least two positions, a first position (1) and a second position (2). In FIG. 3, however, the stator switches 310-322 are each shown in a transition state between the first and second positions. The stator switches 310-322 may be physically separate switches or different wafers of a single switch. The switches 310-322 are each remotely controlled by switch control logic 186, which may be located in the control unit 130. However, it will be appreciated that the switch control logic 186 may be located elsewhere. It should further be appreciated that the switches 310-322 may be any one of numerous controllable switch types including, but not limited to, mechanical switches, relays, and various types of transistors. It should additionally be appreciated that the switches 310-322 may be physically located within the controller 130 or external thereto, as shown in FIG. 3.

With the above-described electrical interconnection scheme, the depicted stator 124 may be selectively configured as either a 4-pole AC stator or a 2-pole DC stator. The specific electrical interconnections for these two different configurations will now be described. Before doing so, however, it is to be appreciated that the stator structure and electrical interconnection scheme depicted and described is merely exemplary of one that may be used to provide a 4-pole AC/2-pole DC stator combination, and that the stator structure and electrical interconnection scheme can be modified to provide any one of numerous M-pole AC/N-pole DC stator combinations.

Figure 4:
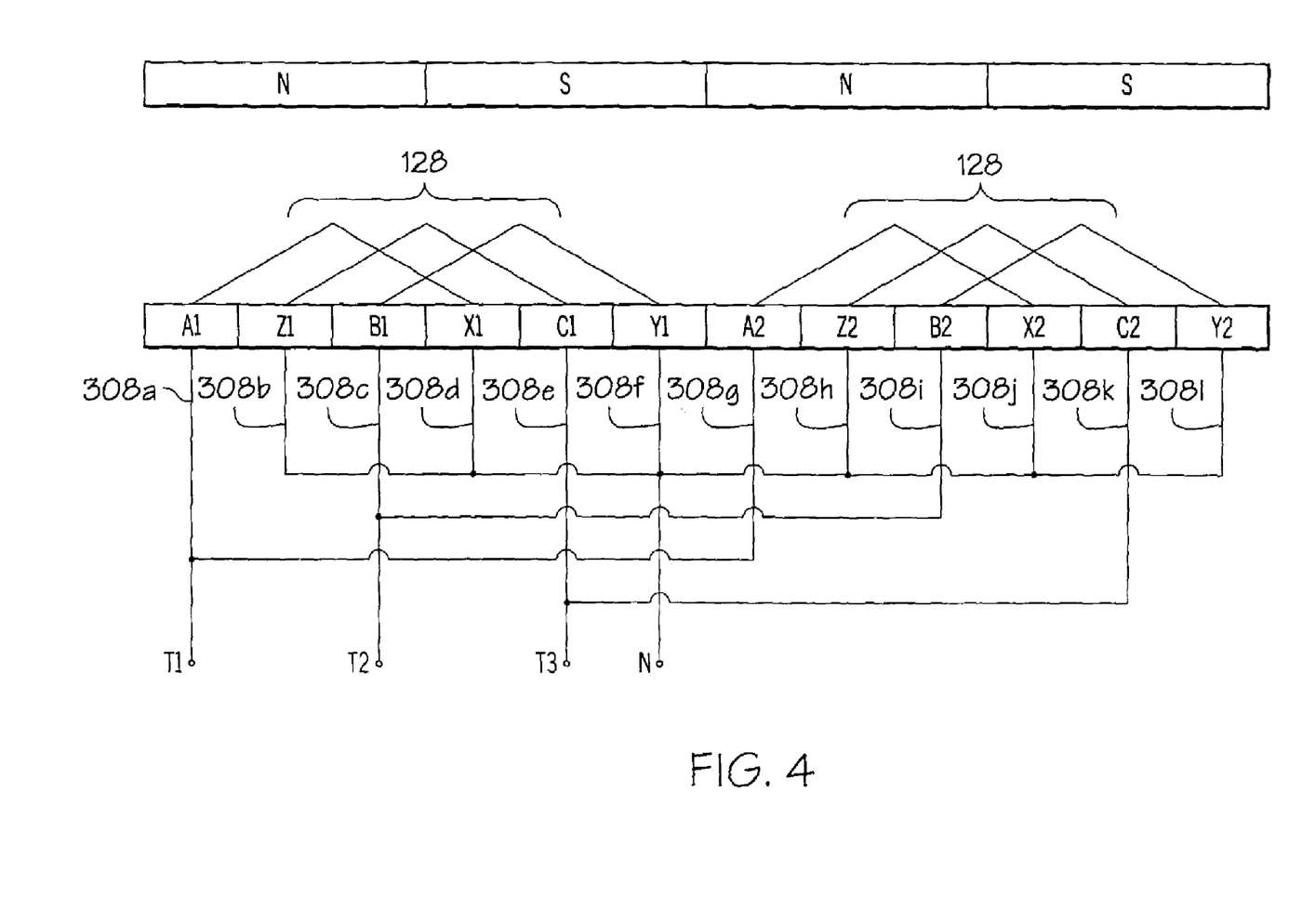
FIG. 4 is a simplified representation of main stator windings, similar to that shown in FIG. 3, with the stator windings electrically connected so that the main stator is configured as a multi-pole AC generator stator.
Figure 5:
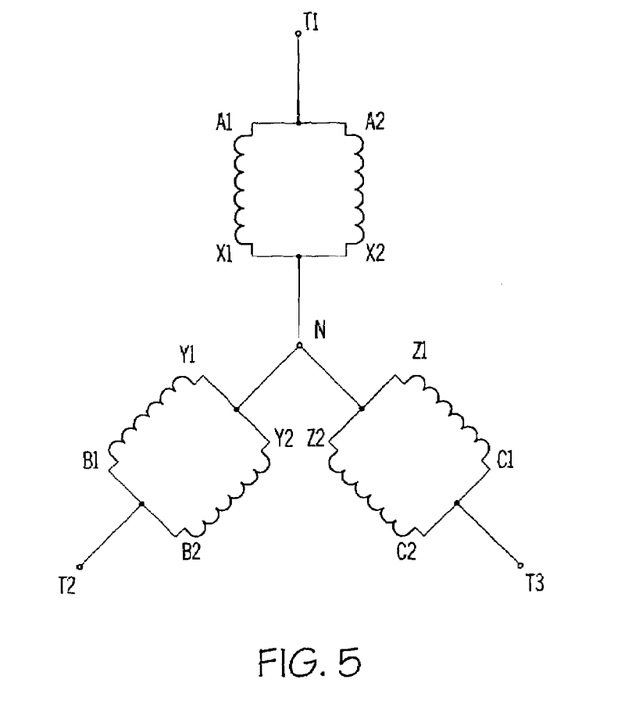
FIG. 5 is a schematic diagram of the main stator windings when configured as a multi-pole AC generator stator.

Referring first to FIGS. 4 and 5, it is seen that when each of the switches 310-322 is moved to the first position (1), the stator 124 is configured as a 4-pole AC stator. Specifically, as FIG. 5 shows, the stator windings 128 are electrically coupled together in a 3-phase, wye (3Ø -Y) configuration. Switches 320 and 322 are positioned such that the DC power supply 180 is not connected to the stator 124. Thus, as FIG. 4 shows, the AC current induced in the stator windings 128 as the rotor 122 rotates induces two magnetic pole pairs in the stator 124. The induced AC currents may also be supplied to a load, via the output leads 126.

Figure 6:
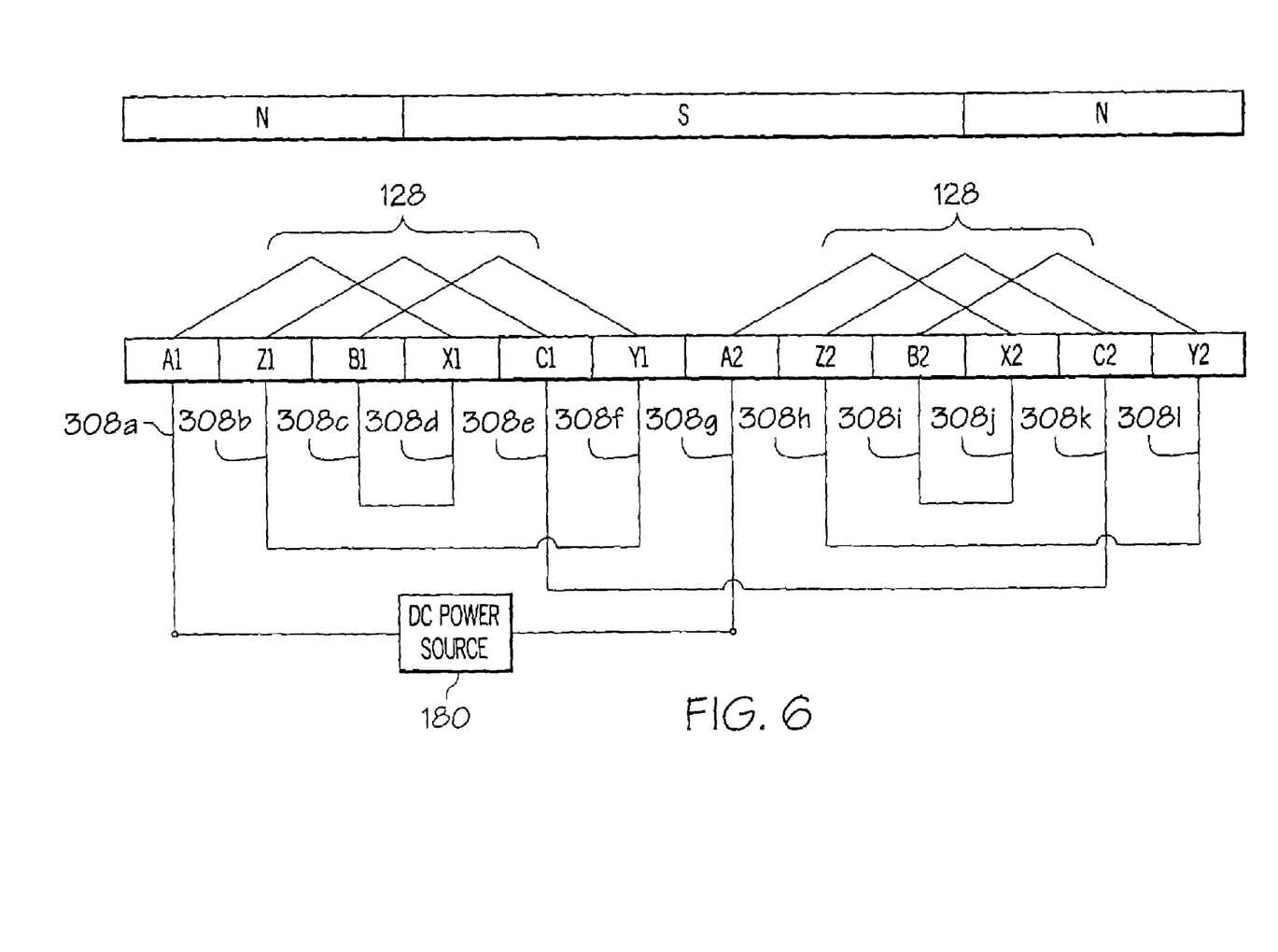
FIG. 6 is a simplified representation of main stator windings, similar to that shown in FIG. 3, with the stator windings electrically connected so that the main stator is configured as a multi-pole DC generator stator.
Figure 7:
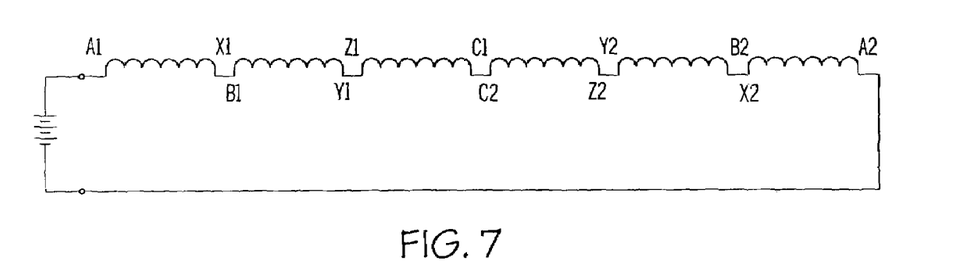
FIG. 7 is a schematic diagram of the main stator windings a schematic diagram of the main stator windings when configured as a multi-pole DC generator stator.

Turning now to FIGS. 6 and 7, it is seen that when each of the switches 310-322 is moved to the second position (2), the stator 124 is configured as a 2-pole DC stator. Specifically, as FIG. 7 shows, the stator windings 128 are electrically coupled in series with one another, and with the DC power source 180. As DC current from the DC power source 180 flows through the stator windings 128, a single magnetic pole pair, shown in FIG. 6, is induced in the stator 124. Thus, when commutated current flows through the rotor windings 126, the rotor 122 will be rotated, supplying rotational power to the gas turbine engine 170 or other mechanical load.

Typically, when the motor/generator system 100 is being implemented as an aircraft starter-generator, the aircraft is on the ground and the starter-generator is initially operated in a DC motor mode. To do so, the switches 310-322 are all moved to the second position (2), the control unit 130 is configured so that controllable DC power is not supplied to the exciter stator 112, and the brushes 150 are moved into contact with the main rotor 122. Thus, the main stator 124 is configured as a 2-pole DC stator, the DC power source 180 supplies DC excitation power to the stator windings 128, and to the rotor windings 126 via the brushes 150. The rectifiers 140 inhibit the DC power supplied to the brushes 150 from reaching the exciter stator 112. The flux interaction between the rotor windings 126 and the stator windings 128, and the commutation provided by the DC brushes 150 and commutator 129, gives rise to rotor 122 rotation. When the rotational speed of the rotor 122 reaches a predetermined magnitude and is increasing, the motor/generator system 100 switches to operation in a generator mode. To do so, the switch control logic 186 automatically moves the switches 310-322 to the first position (1), and the control unit 130 is configured to supply controllable DC power to the exciter stator 112. In addition, the brush control logic 184 causes the actuator 182 to move the brushes 150 out of contact with the rotor 122. Thus, the main stator 124 is configured as a 4-pole AC stator, and the AC power output from the exciter stator 112 is rectified by the rectifiers 140, and supplied to the rotor windings 126.

It will be appreciated that the predetermined rotational speed at which operation switches from the motor mode to the generate mode may vary, depending on the type of engine that is being started. It will additionally be appreciated that the motor/generator 170 could also be switched based on other operational needs or parameters, such as, for example, a specified time period after it begins operating in motor mode.

A main motor/generator stator 124 that is selectively configurable as a multi-pole (e.g., M-pole) DC stator and a multi-pole (e.g., N-pole) AC stator provides additional flexibility over presently known motor generators. For example, with a selectively configurable main stator, the motor generator need not include relatively complex power conversion and frequency control circuits, and that can increase time between maintenance of the DC brushes.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine starter-generator, comprising:
a housing;
a main rotor rotationally mounted within the housing;
a main stator mounted within the housing and located at least partially around at least a portion of the main rotor, the main stator selectively configurable as an M-pole AC stator or an N-pole DC stator; and
a control circuit electrically coupled to at least the main stator and operable to selectively configure the main stator as the M-pole AC stator or the N-pole DC stator.

2. The starter-generator of claim 1, further comprising:
a plurality of windings wound on at least a portion of the main stator; and
a plurality of switches electrically coupled between selected ones of the main stator windings, each of the switches having at least a first position and a second position,
wherein the main stator is configured as the M-pole AC stator with the plurality of switches in the first position, and is configured as the N-pole DC stator with plurality of switches in the second position.

3. The starter-generator of claim 2, wherein the control circuit comprises:
switch control circuitry operable to move the plurality of switches between at least the first position and the second position.

4. The starter-generator of claim 1, further comprising:
a plurality of main rotor windings wound on at least a portion of the main rotor, each of the main rotor windings adapted to selectively electrically couple to a DC power source.

5. The starter-generator of claim 4, further comprising:
at least two brushes adapted to electrically couple to the DC power source and selectively moveable into, and out of, electrical contact with at least a portion of the main rotor, whereby the brushes are electrically coupled to, and decoupled from, respectively, the main rotor windings.

6. The starter-generator of claim 4, further comprising:
an exciter rotor mounted on the shaft;
an exciter stator having a plurality of windings wound thereon, the exciter stator mounted within the housing and located at least partially around at least a portion of the exciter rotor; and
at least one rectifier assembly electrically coupled in series between the exciter stator windings and the main rotor windings.

7. The starter generator of claim 1, further comprising:
a DC power source electrically coupled in series with the main stator when the main stator is configured as an N-pole DC stator.

8. The starter-generator of claim 1, wherein M is unequal to N.

9. The starter-generator of claim 8, wherein N=(M/2).

10. A gas turbine engine starter-generator, comprising:
a housing;
a rotor rotationally mounted within the housing;
a stator mounted within the housing and located at least partially around at least a portion of the rotor, the stator selectively configurable as an M-pole AC stator or an N-pole DC stator;
a plurality of rotor windings wound on at least a portion of the main rotor; and
at least two brushes adapted to electrically couple to a DC power source and selectively moveable into, and out of, electrical contact with at least a portion of the main rotor, whereby the brushes are electrically coupled to, and decoupled from, respectively, the rotor windings; and
a control circuit electrically coupled to at least the main stator and operable to selectively configure the main stator as the M-pole AC stator or the N-pole DC stator.

11. The starter-generator of claim 10, further comprising:
a plurality of windings wound on at least a portion of the main stator; and
a plurality of switches electrically coupled between selected ones of the main stator windings, each of the switches having at least a first position and a second position,
wherein the main stator is configured as the M-pole AC stator with the plurality of switches in the first position, and is configured as the N-pole DC stator with the plurality of switches in the second position.

12. The starter-generator of claim 11, wherein the control circuit comprises:
switch control circuitry operable to move the plurality of switches between at least the first position and the second position.

13. The starter-generator of claim 10, further comprising:
an exciter rotor mounted on the shaft;
an exciter stator having a plurality of windings wound thereon, the exciter stator mounted within the housing and located at least partially around at least a portion of the exciter rotor; and
at least one rectifier assembly selectively electrically coupled in series between the exciter stator windings and the main rotor windings.

14. The starter generator of claim 10, further comprising:
a DC power source electrically coupled in series with the main stator when the main stator is configured as the N-pole DC stator.

15. The starter-generator of claim 10, wherein M is unequal to N.

16. The starter-generator of claim 15, wherein N=(M/2).

17. A gas turbine engine staffer-generator, comprising:
a housing;
a shaft rotationally mounted within the housing;
a main rotor mounted on the shaft;
a main stator mounted within the housing and located at least partially around at least a portion of the main rotor;
a plurality of main stator windings wound around at least a portion of the main stator;
a plurality of switches electrically coupled between selected ones of the main stator windings, each of the switches having at least a first position and a second position; and
a control circuit operable to selectively move the plurality of switches between the first and second positions,
wherein the switches, when in the first position, electrically couple the main stator windings such that the main stator is configured as an M-pole AC stator and, when in the second position, electrically couple the main stator windings such that the main stator is configured as an N-pole DC stator.

18. The starter-generator of claim 17, wherein the control circuit includes:
switch control circuitry operable to selectively move the plurality of switches between the first and second positions.

19. The starter-generator of claim 17, further comprising:
a plurality of main rotor windings wound on at least a portion of the main rotor, each of the main rotor windings adapted to selectively electrically couple to a DC power source.

20. The starter-generator of claim 19, further comprising:
at least two brushes adapted to electrically couple to the DC power source and selectively moveable into, and out of, electrical contact with at least a portion of the main rotor, whereby the brushes are electrically coupled to, and decoupled from, respectively, the main rotor windings.

21. The starter-generator of claim 19, further comprising:
an exciter rotor mounted on the shaft;
an exciter stator having a plurality of windings wound thereon, the exciter stator mounted within the housing and located at least partially around at least a portion of the exciter rotor; and
at least one rectifier assembly electrically coupled in series between the exciter stator windings and the main rotor windings.

22. The starter generator of claim 18, further comprising:
a DC power source electrically coupled in series with the main stator when the main stator is configured as an N-pole DC stator.

23. The starter-generator of claim 17, wherein M is unequal to N.

24. The starter-generator of claim 23, wherein N=(M/2).

25. A stator, comprising:
a main stator body; and
a plurality of stator coils wound around at least a portion of the main body,
wherein the stator coils are wound in a configuration that allows the stator to be selectively configured as an M-pole AC stator or an N-pole DC stator; and
a plurality of switches electrically coupled between selected ones of the stator coils, each of the switches having at least a first position and a second position.

26. The stator of claim 25, wherein the stator is configured as the M-pole AC stator with the switches in the first position, and is configured as the N-pole DC stator with the switches in the second position.

27. The stator of claim 25, wherein M is unequal to N.

28. The stator of claim 27, wherein N=(M/2).

29. In a motor/generator including a stator having a plurality of stator windings wound around at least a portion thereof, a method of operating the motor/generator, comprising:
electrically coupling at least a portion of the stator windings together such that the main stator is configured as an N-pole DC stator and supplying DC power to the electrically coupled stator windings, to thereby operate the motor/generator as a DC motor; and
electrically coupling at least a portion of the stator windings together such that the main stator is configured as an M-pole AC stator and no longer supplying DC power thereto, to thereby operate the motor/generator as an AC generator,
wherein the motor/generator changes from operation as a DC motor to an AC generator when its rotational speed reaches a predetermined magnitude.

30. The method of claim 29, wherein the motor/generator further includes a rotationally mounted rotor having a plurality of rotor windings wound around at least a portion thereof, and at least two brushes that are selectively electrically coupled to, and decoupled from, the rotor windings, the method further comprising:
electrically coupling the brushes to the rotor windings when operating the motor/generator as a DC motor; and
electrically decoupling the brushes from the from rotor windings when operating the motor/generator as an AC generator.

31. In a motor/generator including a stator having a plurality of stator windings wound around at least a portion thereof, a method of operating the motor/generator, comprising:
electrically coupling at least a portion of the stator windings together such that the main stator is configured as an N-pole DC stator and supplying DC power to the electrically coupled stator windings, to thereby operate the motor/generator as a DC motor; and
electrically coupling at least a portion of the stator windings together such that the main stator is configured as an M-pole AC stator and no longer supplying DC power thereto, to thereby operate the motor/generator as an AC generator,
wherein the motor/generator changes from operation as a DC motor to an AC generator a predetermined time after commencing operation as a DC motor.

* * * * *

UNITED STATES PATENT AND TRADEMARK OFFICE
CERTIFICATE OF CORRECTION

PATENT NO. : 7,576,508 B2
APPLICATION NO. : 10/354782
DATED : August 18, 2009
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1799 days.

Signed and Sealed this

Seventh Day of September, 2010

David J. Kappos
*Director of the United States Patent and Trademark Office*